United States Patent
Sharma et al.

(10) Patent No.: US 10,834,771 B2
(45) Date of Patent: Nov. 10, 2020

(54) TELECOMMUNICATIONS APPARATUS AND METHODS FOR HANDLING SPLIT RADIO BEARERS

(71) Applicant: Sony Corporation, Tokyo (JP)

(72) Inventors: Vivek Sharma, Basingstoke (GB); Brian Alexander Martin, Basingstoke (GB); Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/334,766

(22) PCT Filed: Aug. 30, 2017

(86) PCT No.: PCT/EP2017/071772
§ 371 (c)(1),
(2) Date: Mar. 20, 2019

(87) PCT Pub. No.: WO2018/059866
PCT Pub. Date: Apr. 5, 2018

(65) Prior Publication Data
US 2020/0008255 A1 Jan. 2, 2020

(30) Foreign Application Priority Data
Sep. 28, 2016 (EP) ...................... 16191055

(51) Int. Cl.
*H04W 76/15* (2018.01)
*H04W 76/20* (2018.01)
(Continued)

(52) U.S. Cl.
CPC ....... *H04W 76/15* (2018.02); *H04W 12/0017* (2019.01); *H04W 12/0401* (2019.01);
(Continued)

(58) Field of Classification Search
CPC .. H04W 76/15; H04W 76/20; H04W 12/0017
See application file for complete search history.

(56) References Cited

FOREIGN PATENT DOCUMENTS

| | | |
|---|---|---|
| EP | 2922363 A1 | 9/2015 |
| WO | 2015/015300 A2 | 2/2015 |
| WO | 2015/015300 A3 | 7/2015 |

OTHER PUBLICATIONS

NTT DOCOMO, "SCG Change Procedure over X2", 3GPP TSG-RAN3 Meeting No. 85bis R3-142397, Oct. 6-11, 2014, Shanghai China, pp. 1-6.
(Continued)

*Primary Examiner* — Ronald B Abelson
(74) *Attorney, Agent, or Firm* — Xsensus LLP

(57) ABSTRACT

A method for use in a wireless telecommunications network, the method including: when a secondary base station exhausts a supply of unique parameter sets used in security ciphering of received split radio bearers, the secondary base station sends a notification to a master base station of a requirement to alter data handling resources allocated for handling split radio bearers received from the secondary base station in one or both of the master base station and a terminal device; and the master base station, in response to the notification, operating to effect an alteration in the said data handling resources.

18 Claims, 7 Drawing Sheets

(51) Int. Cl.
  *H04W 12/00*   (2009.01)
  *H04W 12/04*   (2009.01)
  *H04W 80/02*   (2009.01)
  *H04W 88/08*   (2009.01)
(52) U.S. Cl.
  CPC ..... *H04W 12/04031* (2019.01); *H04W 76/20* (2018.02); *H04W 80/02* (2013.01); *H04W 88/085* (2013.01)

(56) References Cited

OTHER PUBLICATIONS

Holma et al., "LTE for UMTS OFDMA and SC-FDMA Based Radio Access", Wiley 2009, System Architecture Based on 3GPP SAE, 11 pages.

3GPP, "Technical Specification Group Radio Access Network; Evolved Universal Terrestrial Radio Access (E-UTRA); Medium Access Control (MAC) protocol specification", Release 13, 3GPP TS 36.321 V13.2.0, Jun. 2016, pp. 1-91.

3GPP, "Technical Specification Group Radio Access Network; Evolved Universal Terrestrial Radio Access (E-UTRA); Radio Link Control (RLC) protocol specification", Release 13, 3GPP TS 36.322 V13.2.0, Jun. 2016, pp. 1-45.

3GPP, "Technical Specification Group Radio Access Network; Evolved Universal Terrestrial Radio Access (E-UTRA); Packet Data Convergence Protocol (PDCP) specification", Release 13, 3GPP TS 36.323 V13.2.1 Jun. 2016, pp. 1-39.

CATT, "Consideration on key refresh procedure", 3GPP TSG-RAN WG3 Meeting No. 85bis R3-142172, Shanghai P.R. China, Oct. 6-10, 2014, pp. 1-6.

3GPP, "Technical Specification Group Radio Access Network; Evolved Universal Terrestrial Radio Access (E-UTRA) and Evolved Universal Terrestrial Radio Access Network (E-UTRAN)", Overall description Stage 2 Release 13, 3GPP TS 36.300 V13.4.0 Jun. 2016, pp. 1-310.

3GPP, "Technical Specification Group Radio Access Network; Evolved Universal Terrestrial Radio Access (E-UTRA); Base Station (BS) radio transmission and reception", Release 8, 3GPP TR 36.804 V1.2.0, Apr. 2008, pp. 1-62.

3GPP, "Technical Specification Group Radio Access Network; Evolved Universal Terrestrial Radio Access (E-UTRA); Study on Small Cell Enhancements for E-UTRA and E-UTRAN—Higher layer aspects", Release 12, 3GPP TR 36.842 V1.0.0, Nov. 2013, pp. 1-68.

3GPP, "Reply LS on key change during HO for eLWA", 3GPP TSG RAN WG2 Meeting No. 94 R2-163323, Nanjing, China, May 23-27, 2016, 1 page.

ZTE Corporation et al., "Consideration on the SCG split bearer", 3GPP TSG RAN WG2 Meeting No. 95 R2-165127, Gothenburg, Sweden, Aug. 22-26, 2016, 4 pages.

NTT DOCOMO Inc., "Discussion on SCG split bearer", 3GPP TSG-RAN WG2 Meeting No. 95 R2-165302, Gothenburg, Sweden, Aug. 22-26, 2016, pp. 1-3.

Ericsson, "Security in NR", 3GPP TSG-RAN WG2 Meeting No. 95 Tdoc R2-165543, Gothenburg, Sweden, Aug. 22-26, 2016, pp. 1-4.

International Search Report dated Feb. 12, 2018 for PCT/EP2017/071772 filed on Aug. 30, 2017, 13 pages.

TELECOMMUNICATIONS APPARATUS AND METHODS FOR HANDLING SPLIT RADIO BEARERS

CROSS-REFERENCE TO RELATED APPLICATIONS

The present application is based on PCT filing PCT/EP2017/071772, filed Aug. 30, 2017, which claims priority to EP 16191055.9 filed Sep. 28, 2016, the entire contents of which are incorporated herein by reference.

BACKGROUND

Field

The present disclosure relates to apparatus and methods for handling split radio bearers in a telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunications systems, such as those based on the 3GPP defined UMTS and Long Term Evolution (LTE) and Long Term Evolution Advance (LTE-A) architectures, are applicable to communications between networked user devices such as mobile telephones, and more widely also to applications such as the Internet of Things. The networked devices are supported by a telecommunications network comprising base stations of various configurations offering connection coverage over particular areas, known as cells, and the base stations are in turn supported by a core network. Transmission of data and other signalling between these various entities is achieved by the use of radio bearers which transport the required messages, for example as a signalling radio bearer which carries operational information for the entities, or a data radio bearer which carries data. In some instances a bearer is direct between two entities (a base station and a user device), one sending the message and the other receiving it. In other cases, a split bearer may be used, allowing a received message to be divided between the radio handling resources of two receiving entities. Hence, a split bearer is divided between two base stations, each of which passes its part of the split bearer to a user device. The user device is appropriately configured with resources to handle data received from each base station so that it can manage the split bearer. This arrangement shares resources and enhances speed and efficiency.

The splitting of bearers in this way requires consideration of the operation of the resources in both of the entities between which the bearer is split, and the resources in the user device corresponding to each entity. Resources for each side of the split bearer should be maintained in an operational state for successful handling of the message.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
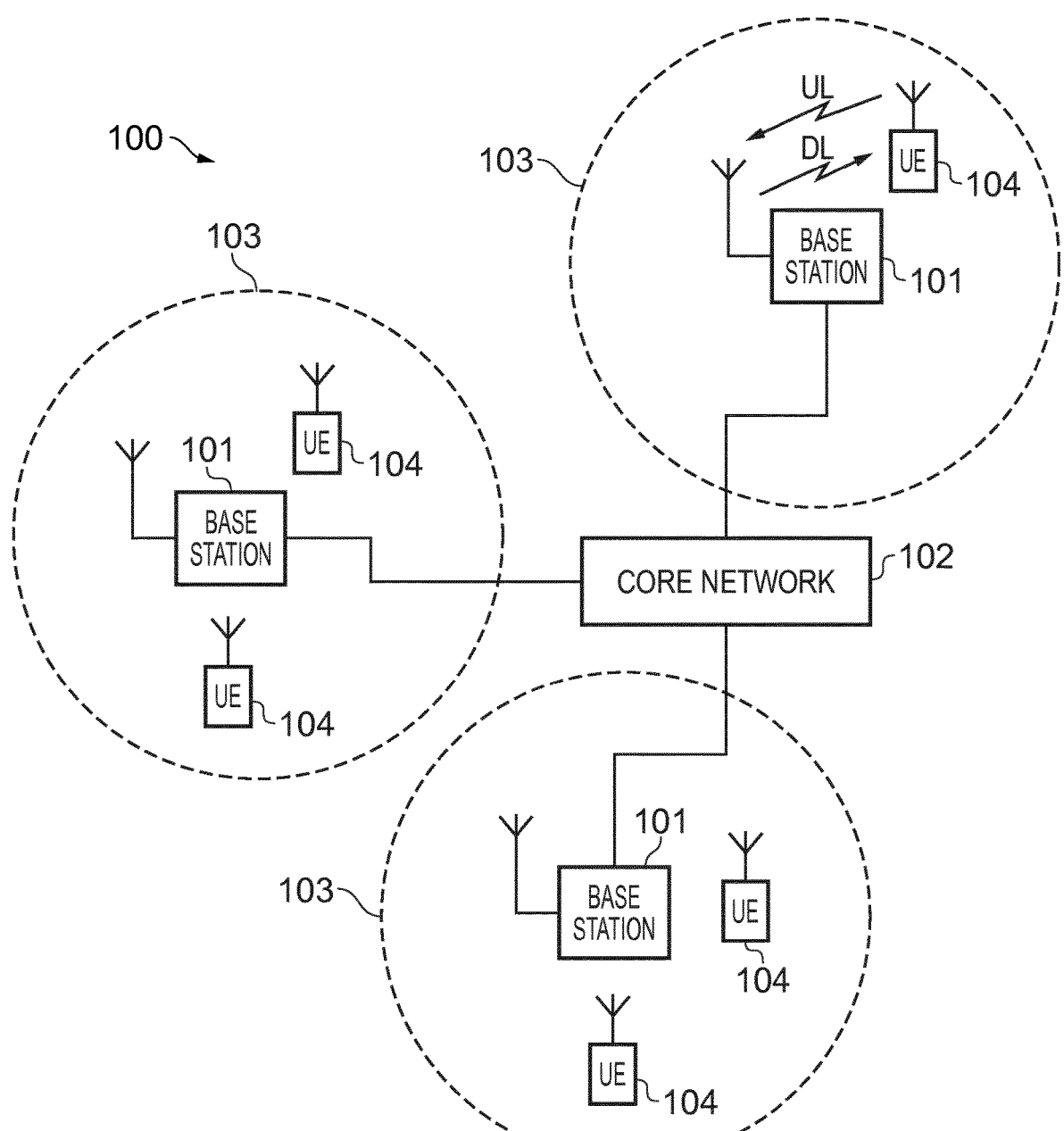
FIG. 1 shows a schematic representation of an example mobile telecommunications network or system.

FIG. 1 shows a schematic diagram illustrating some basic functionality of a mobile (cellular, wireless) telecommunications network/system, in this example operating generally in accordance with LTE principles, and which may be adapted to implement embodiments of the disclosure as described further below. Various embodiments of FIG. 1 and their respective modes of operation are well-known and defined in the relevant standards administered by the 3GPP® body, and also described in many books on the subject, for example Holma and Toskala [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 in FIG. 1 includes a plurality of base stations 101 connected to a core network 102. Each base station provides a coverage area or cell 103 within which data can be communicated to and from terminal devices or user equipment 104 within the respective coverage areas 103 via a radio downlink DL. Data is transmitted from user equipment 104 to the base stations 101 via a radio uplink UL. The uplink and downlink communications are made using radio resources that may be used by the operator of the network. The core network 102 routes data to and from each user equipment 104 via the respective base stations 101 and provides functions such as authentication, mobility management, charging and so on. Regarding terminology, terminal devices may also be referred to as mobile stations, user equipment (UE), user terminal, terminal, mobile radio, mobile terminal, mobile device, or simply device, and so forth. Base stations may also be referred to transceiver stations, nodeBs, e-nodeBs, eNBs and so forth.

Figure 1A:
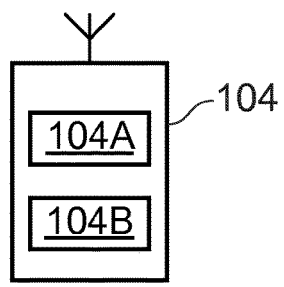
FIG. 1A shows a schematic representation of an example user equipment for use in a network such as the FIG. 1 example.

FIG. 1A shows a schematic representation of an example of a user equipment 104. The user equipment 104 comprises a transceiver unit 104A for transmission and reception of wireless signals and a processor unit 104B configured to control the user equipment. The processor unit 104B may comprise various sub-units for providing functionality in accordance with embodiments of the present disclosure as explained further herein. These sub-units may be implemented as discrete hardware elements or as appropriately configured functions of the processor unit. Thus the processor unit 104B may comprise a processor unit which is suitably configured/programmed to provide the desired functionality described herein using conventional programming/configuration techniques for equipment in wireless telecommunications systems. The transceiver unit 104A and the processor unit 104B are schematically shown on FIG. 1A as separate elements for ease of representation. However, it will be appreciated that the functionality of these units can be provided in various different ways, for example using a single suitably programmed general purpose computer, or suitably configured application-specific integrated circuit(s)/circuitry. It will be appreciated that the user equipment will in general comprise various other elements associated with its operating functionality, for example a power source, user interface, and so forth, but these are not shown in FIG. 1A in the interests of simplicity.

Figure 1B:
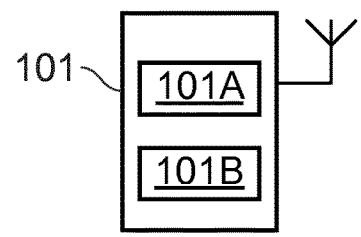
FIG. 1B shows a schematic representation of an example base station for use in a network such as the FIG. 1 example.

FIG. 1B shows a schematic representation of an example of a base station 101. In a network such as that in FIG. 1, each base station 101 may be functionally identical but each serves one or more different geographical area (cells 103). In some examples, base stations may be configured for operation in different related, or interworking, architectures, in an arrangement known as dual connectivity. In general, though, each base station 101 comprises a transceiver unit 101A for transmission and reception of communications between the base station and any user equipment 104 in its cell, and the core network 102. A base station 101 further comprises a processor unit 101B configured to control the base station 101 to operate in accordance with embodiments of the present disclosure as described herein. The processor unit 101B may again comprise various sub-units for providing functionality in accordance with embodiments of the present disclosure as explained herein. Theses sub-units may be implemented as discrete hardware elements or as appropriately configured functions of the processor unit. Thus, the processor unit 101B may comprise a processor unit which is suitably configured/programmed to provide the desired functionality described herein using conventional programming/configuration techniques for equipment in wireless telecommunications systems. The transceiver unit 101A and processor unit 101B are schematically shown in FIG. 1B as separate elements for ease of representation. However, it will be appreciated that the functionality of these units can be provided in various different ways, for example using a single suitably programmed general purpose computer, or suitably configured application-specific integrated circuits (s)/circuitry. It will appreciated that the base station 101 will in general comprise various other elements, for example a power supply, associated with its operating functionality.

In particular, the processor units of user equipment and base stations include resources for handling radio bearers. The resources may include a protocol stack comprising layers including a PDCP (packet data convergence protocol), a RLC (radio link control) and a MAC (medium access control), where the layers may be dedicated to particular types of radio bearer, or may be shared. Under particular events in the network operation, one or more parts of the resources may need to be reset or re-established for continued operation, which herein is referred to generally as reconfiguration, or alternatively as alteration, indicating some change in in the resources, including resetting, re-establishment, clearing, removing from use and other like procedures that alter the way in which the resources are able to handle one or more radio bearer types. The procedures for resetting and re-establishing are well-understood, and specified in the 3GPP standards. For example, the MAC reset procedure is specified in section 5.9 of 3GPP specification TS 36.321, the RLC re-establishment procedure is specified in section 5.4 of 3GPP specification TS 36.322, and the PDCP re-establishment is specified in section 5.2 of 3GPP specification TS 36.323. On a high level, a layer is reset during reset or re-establishment, but different terminology is used in the different specifications for the various protocol layers.

As is well understood, in wireless telecommunications networks such as an LTE type network, there are different Radio Resource Control (RRC) modes for terminal devices, including governing the connection state between the terminal device and a base station. These include an idle mode and a connected mode. Generally speaking, in RRC connected mode a terminal device is connected to a base station in the sense of being able to receive user plane data from the base station, whereas in RRC idle mode the terminal device is unconnected to a base station in the sense of not being able to receive user plane data from the base station. However, in idle mode the terminal device may still receive some communications from base stations, for example, reference signalling for cell reselection purposes and other broadcast signalling.

While the FIG. 1 example network shows all base stations (eNBs) as being the same, and each supporting one cell, in some networks and systems other arrangements may be used. For example, in Release 12 of the 3GPP standard governing the LTE architectures, the concept of dual connectivity (DC) was introduced. In dual connectivity, base stations are specified as being either a master base station or a secondary base station, and user equipment can connect with both.

Figure 2:
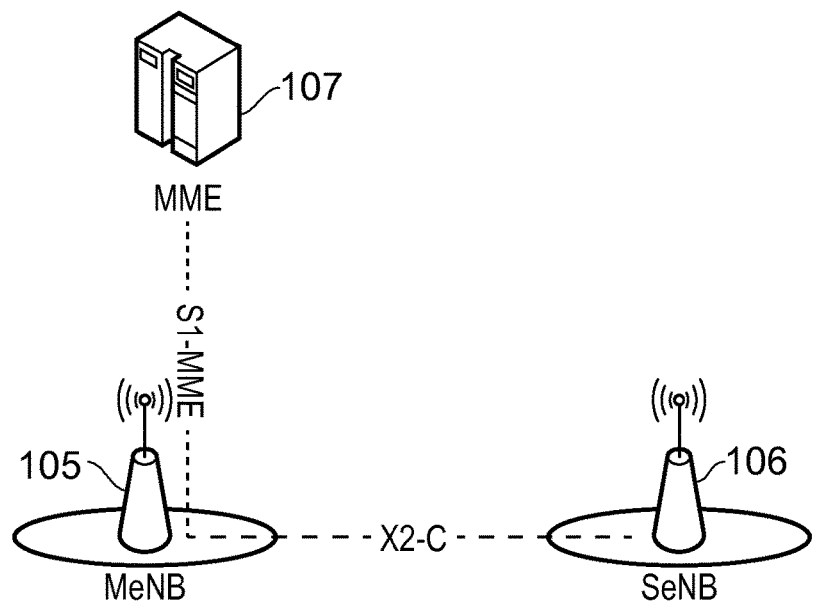
FIG. 2 shows a schematic representation of base stations and user equipment arranged for dual connectivity.

FIG. 2 shows a schematic representation of the control plane architecture specified for dual connectivity. A master base station 105 (designated MeNB) and a secondary base station 106 (designated SeNB) communicate via a control plane using X2-C layer protocol. However, unlike the description above in which any base station is involved in handling RRC communications, in dual connectivity only the MeNB 105 is designated for RRC handling. Consequently, the RRC entity resides in the MeNB 105, and communication with the core network in the form of a mobility management entity 107 (MME) via an S1-MME protocol layer terminates in the MeNB 105.

Figure 3:
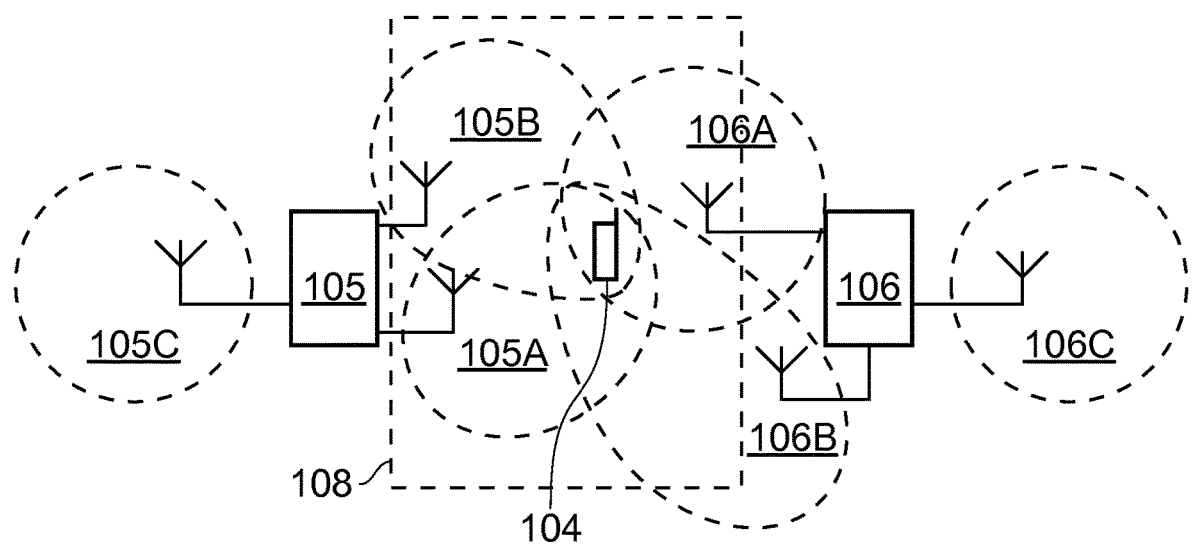
FIG. 3 shows a schematic representation of base stations and user equipment with cells arranged in groups.

Also, it is possible for a base station, being a master or a secondary eNB, to support more than one cell. FIG. 3 shows a schematic representation of part of a network having a MeNB 105 supporting three cells 105A, 105B and 105C, and a SeNB 106 supporting three cells 106A, 106B and 106C. A user equipment UE 104 has access to cells from both eNBs, indicated as the group 108. Within the group 108, one cell can be a primary cell, from the MeNB cells. Within the group 108 relating to the UE 104, the MeNB cells 105A and 105B are designated as a master cell group MCG, and the SeNB cells 106A and 106B are designated as a secondary cell group SCG. The UE 104 has access to the cells of MCG and the two cells of the SCG, indicated by the overlapping cell areas in FIG. 3.

A purpose of the dual connectivity arrangement is to enable sharing and combining of resources belonging to different base stations. This sharing is expressed in the concept of split bearers.

Figure 4:
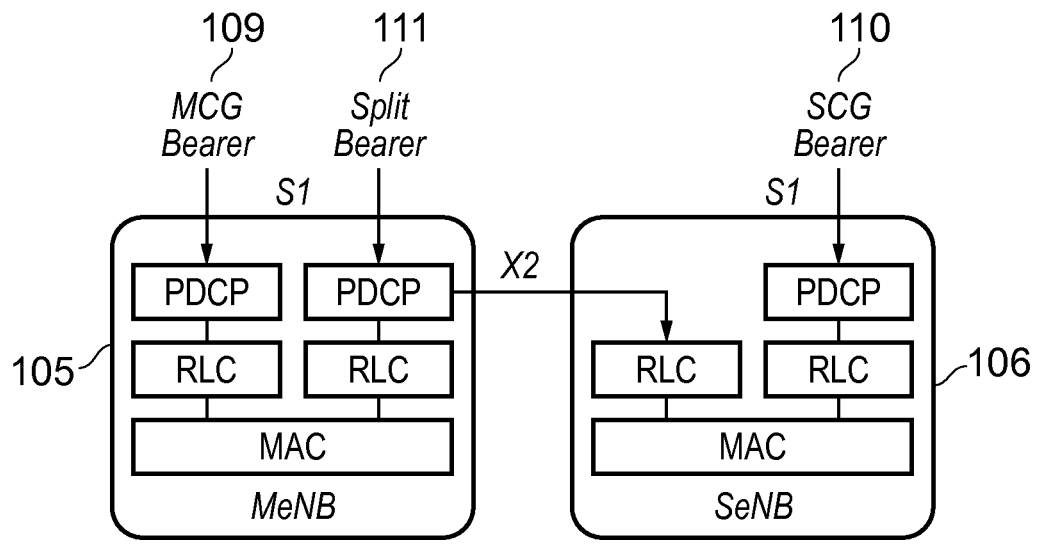
FIG. 4 shows a schematic representation of an example user plane protocol stack for dual connectivity.

FIG. 4 show a schematic representation of an example user plane protocol stack for a dual connectivity arrangement. Typically, an incoming message arrives via a bearer and is handled by the various protocol layers defined within the LTE architecture. Once master and secondary eNBs are defined and grouped in dual connectivity, one can further designate a bearer intended for the MeNB 105 as a master cell group bearer, MCG bearer 109, and a bearer intended for the SeNB 106 as a secondary cell group bearer, SCG bearer 110. A bearer arrives via the S1 protocol layer, is handled by the eNB's resources in turn by a packet data convergence protocol (PDCP), then a radio link control (RLC) protocol, and then the medium access control (MAC) layer. As shown in FIG. 4, each eNB 105, 106 has these resource layers to handle received bearers.

In addition to the MCG bearer and the SCG bearer, dual connectivity defines a third, split bearer, for the purpose of sharing resources in the MeNB and the SeNB on the network side of the telecommunications system. A split bearer 111 is delivered to a PDCP in the MeNB 105, and the MeNB 105, at the PDCP, then controls a split or division of the split bearer's data between the MeNB 105 and the SeNB 106. Data for the MeNB 105 is passed to the MeNB's RLC and then its MAC, and data for the SeNB 106 is passed from the MeNB 105, using the X2 protocol layer, to an RLC in the SeNB and then to the MAC of the SeNB.

In order to be able to handle a message carried by a split bearer once it is passed on from the two eNBs, a UE is provided with two MAC entities, a master cell group MAC (MCG MAC) and a secondary cell group MAC (SCG MAC), plus corresponding RLC and PDCP. These are included in the resources of the UE for split bearer handling.

As mentioned above, only the MeNB has a RRC entity, so signalling radio bearers for RRC are transported over the MCG only, i.e. by MCG bearer. The SCG is not involved in the transporting of RRC messages. For UEs configured for dual connectivity and split bearer transport, user traffic from the core network can be received at the MeNB as a split bearer, and then divided between the MeNB and the SeNB for handling and passing to the UE. Any traffic on a SCG bearer is received from the core network at the SeNB and transported using resources of the SeNB to the UE.

In the context of LTE, further details regarding dual connectivity can be found in the 36.300 specification at sections 6.5 and 7.6, and also in 3GPP TR 36.842.

As can be seen from FIG. 4, a bearer arrives at the PDCP protocol layer. The PDCP is involved in security of the data traffic, including ciphering using a key. Each PDCP in each network entity (eNBs and UEs, for example) will use its own key; these are regularly updated. The MeNB may use a key designated as KeNB, while the SeNB may use a key designated as SKeNB. Other parameters are utilised by the PDCP together with the key to effect security; these include a numerical counter to generate successive numbers in a sequence of count values. Hence there is a set of parameters, used in a security algorithm to perform the ciphering. Each set of parameters, one for each successive number from the count value, is used only once for ciphering, to maintain security. The count value has a maximum number that can be generated, so for a given key, once this number is reached, there are no new parameter sets available for ciphering. Re-use of parameters is undesirable, so it is preferred to acquire a new key for the PDCP and start the count value sequence again at its beginning (at zero, for example), to work through all successive values in the count value sequence with the new key. The expiration of the numbers available from the counter can be referred to as "rollover", and hereinafter the disclosure may mention "PDCP rollover", "PDCP counter rollover", "PDCP count rollover or "count rollover". The process following rollover, including acquisition of a new key, has a high processing overhead associated with it, and requires a resetting of the MAC layer for handling of ciphering with the new key.

An example of a possible network configuration for future telecommunications is an arrangement comprising an LTE architecture providing wide (macro) coverage in conjunction with a so-called new radio (NR), referring to current and future telecommunications methods allowing increased data throughput, such as 4th and 5th generations (4G and 5G) and further. The type of radio access technology (RAT) used in the LTE network and the new radio network may be different, but an LTE network and a NR network could interwork, where a benefit of having connectivity to both LTE and NR is reduced signalling towards the core network from mobility towards the core network being anchored at the LTE macro entity, combined with higher throughput made possible be utilising resources in both LTE and NR. A UE will be configured to operate under both RATs. In this context, dual connectivity is relevant, such that MeNBs may be designated from LTE and SeNBs from NR, or vice versa.

Split bearers are therefore also relevant, and a new split bearer configuration is considered, namely a secondary cell group split bearer, or SCG split bearer.

Figure 5:
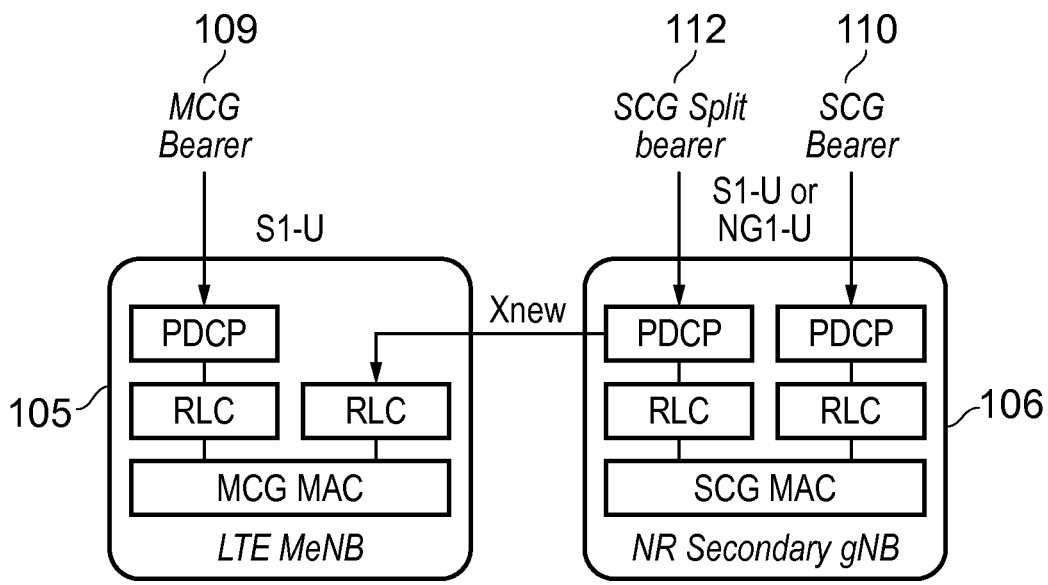
FIG. 5 shows a schematic representation of a modified example user plane protocol stack for dual connectivity.

FIG. 5 shows a schematic representation of an example user plane protocol stack utilising a SCG split bearer. As in FIG. 4, a master node 105 (in this example in the LTE side) and a secondary node 106 each receive their designated bearers, MCG bearer 109 and SCG bearer 110 respectively, and these are handled by a PCDP, a RLC and a MAC layer, as before. No conventional split bearer is included, however; instead there is a SCG split bearer 112 which is delivered to the SeNB 106 (labelled Secondary gNB in FIG. 5 to indicate a difference from the eNB of FIG. 4 owing to the addition of the NR network). A PDCP in the SeNB 106 receives the SCG split bearer 112 and divides the data. Some is retained in the SeNB, being passed to the RLC and MAC layers. Other data is passed from the SeNB 106 to the MeNB 105 via an X protocol layer (labelled Xnew to indicate possible change from the X layers within LTE, such as the X1 layer in FIG. 4), and the MeNB 105 handles it with its own RLC and MAC resources.

The SCG split bearer is proposed in the context of the higher data rates that can be handled in an NR architecture. Note this is merely an example, however, and secondary cell group split bearers are relevant in other contexts also.

FIG. 5 shows SCG split and SCG bearers together, and they may be simultaneously used or supported. SCG bearer can be considered as a special case of SCG split bearer, in which 100% of the data traffic is over the SCG and 0% over the MCG. Either or both of the SCG bearer and the SCG split bearer may coexist alongside the MCG bearer. However, coexistence of the MCG split bearer (as in the FIG. 4 example) and the SCG split bearer is unlikely owing to different transport requirements and hence a need for a high bandwidth in the user plane anchor. However, any coexistence of bearer types is not relevant to the present disclosure, and embodiments and examples addressing the SCG split bearer can be implemented regardless of other secondary node bearers.

However, the coexistence of the MCG bearer and the SCG split bearer implies that there will be at least one PDCP entity in the MCG, to handle the MCG bearer, and at least one PDCP entity in the SCG, to handle the SCG split bearer. Consequently, ciphering will be carried out using two keys, the KeNB in the MCG PDCP and the SKeNB in the SCG PDCP. The MeNB MAC receives data ciphered with both keys.

Recall the above discussion that mentioned PDCP count rollover. Under 3GPP Release 12 for dual connectivity, a "SCG change" procedure is defined for situations including a rollover of the SeNB PDCP receiving the SCG bearer. This is defined in section 10.1.2.8.6 of the 36.300 standard, and includes the requirement that "During SCG change, MAC configured for SCG is reset and RLC configured for SCG is re-established regardless of the bearer type(s) established on SCG. For SCG bearer, PDCP configured for SCG is re-established. In case of reconfiguration from split to MCG bearer, RLC configured for SCG is released. During SCG change, S-KeNB key is refreshed."

Figure 6:
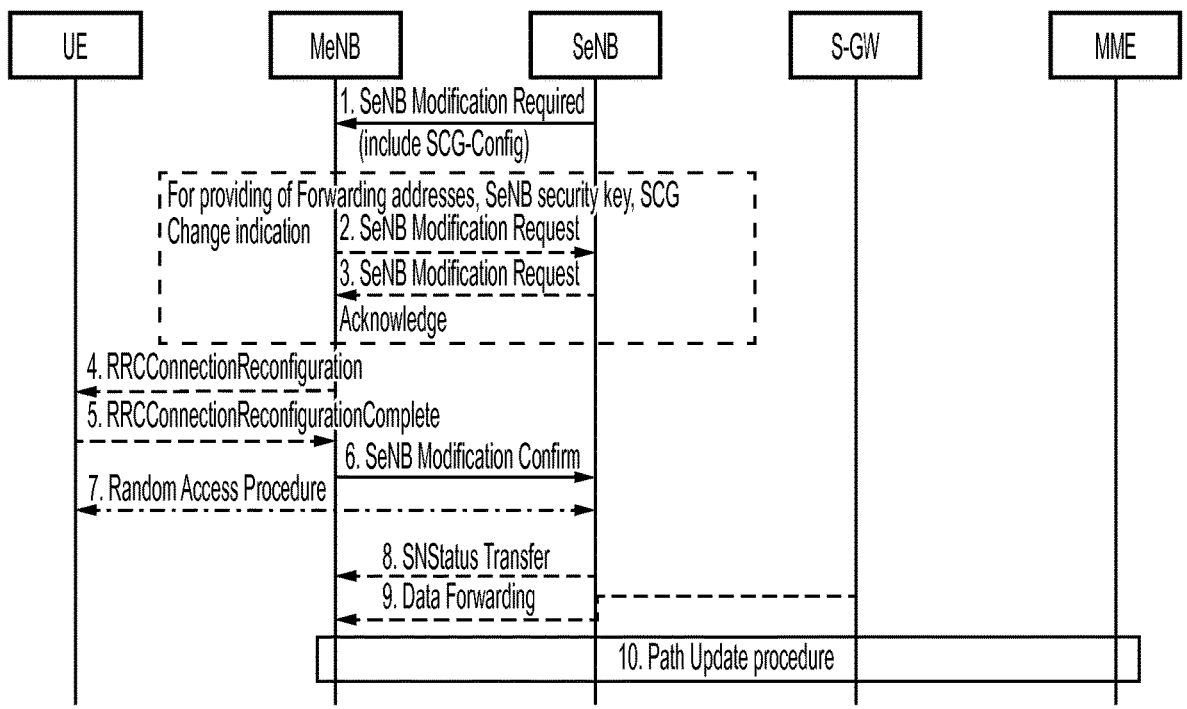
FIG. 6 shows a ladder diagram of steps in a reconfiguration ("change") procedure for use following a protocol counter rollover in a secondary cell group within a network.

The SCG change procedure is applicable in a range of scenarios. FIG. 6 shows a depiction of the procedure, from standard 36.300 section 10.1.2.8.2.

This scope of SCG change procedure is restricted to cells under control of the SeNB, and therefore in the SCG. However, a SCG split bearer will use a RLC instance in the MCG (see FIG. 5), and share the MCG MAC with other MCG bearers including SRBs (signalling radio bearers, for RRC signalling). Also, note that in any change between MCG bearer and (conventional) split bearer there will be no need to reset any of the MCG resources because ciphering for both bearers is done in MCG PDCP (see FIG. 4), and MCG RLC and MCG MAC can continue without any reset.

This is not possible for the SCG split bearer, however, because the SCG PDCP in the SeNB will cipher the SCG split bearer, before passing it to resources in the MCG (RLC and MAC in the MeNB).

Hence, a difficulty can arise for SCG split bearers when a PDCP count rollover occurs in the SeNB. Recall from above that a count rollover initiates the SCG change procedure, which includes refreshing of the SKeNB key. Resources in the MeNB may then be unable to handle their allocated part of the SCG split bearer.

Standard 36.300, section 14.1 specifies PDCP count in dual connectivity as: SCG bearers in DC share a common pool of radio bearer identities (DRB IDs) together with the MCG bearers and when no new DRB ID can be allocated for an SCG bearer without guaranteeing COUNT reuse avoidance, the MeNB shall derive a new S-$K_{eNB}$. SeNB indicates to MeNB when uplink or downlink PDCP COUNTs are about to wrap around and MeNB shall update the S-$K_{eNB}$. To update the S-$K_{eNB}$, the MeNB increases the SCG Counter and uses it to derive a new S-$K_{eNB}$ from the currently active KeNB in the MeNB. The MeNB sends the newly derived S-$K_{eNB}$ to the SeNB. The newly derived S-$K_{eNB}$ is then used by the SeNB in computing a new encryption key $K_{UPenc}$ which is used with all DRBs in the SeNB for this UE. Furthermore, when the SCG Counter approaches its maximum value, the MeNB refreshes the currently active KeNB, before any further S-$K_{eNB}$ is derived.

From this we can appreciate that in the event of PDCP rollover for a SCG split bearer, it is required that the SCG change procedure should be initiated for the resources under the SeNB, i.e. SCG RLC and PDCP should be re-established and the SCG MAC is reset. In the scenario of LTR-NR interworking described above, it is likely that PDCP count rollover will happen in the NR PDCP (in other words, the SeNB, as in FIG. 5), because the majority of the data traffic will be pushed using NR (rather than LTE) to take advantage of the higher throughput. Accordingly, following a similar logic, and because SCG split bearer data packets will be ciphered by the SCG PDCP, rollover of the SCG PDCP suggest a requirement for a change procedure in which the MCG RLC should be re-established, and the MCG MAC should also be reset.

Consequently, a proposal to address the issue of PDCP rollover in the SeNB when SCG split bearers are used is to ensure that appropriate handling of the MCG resources is undertaken, which is some examples includes resetting/re-establishing of the MCG RLC and the MCG MAC.

Figure 7:
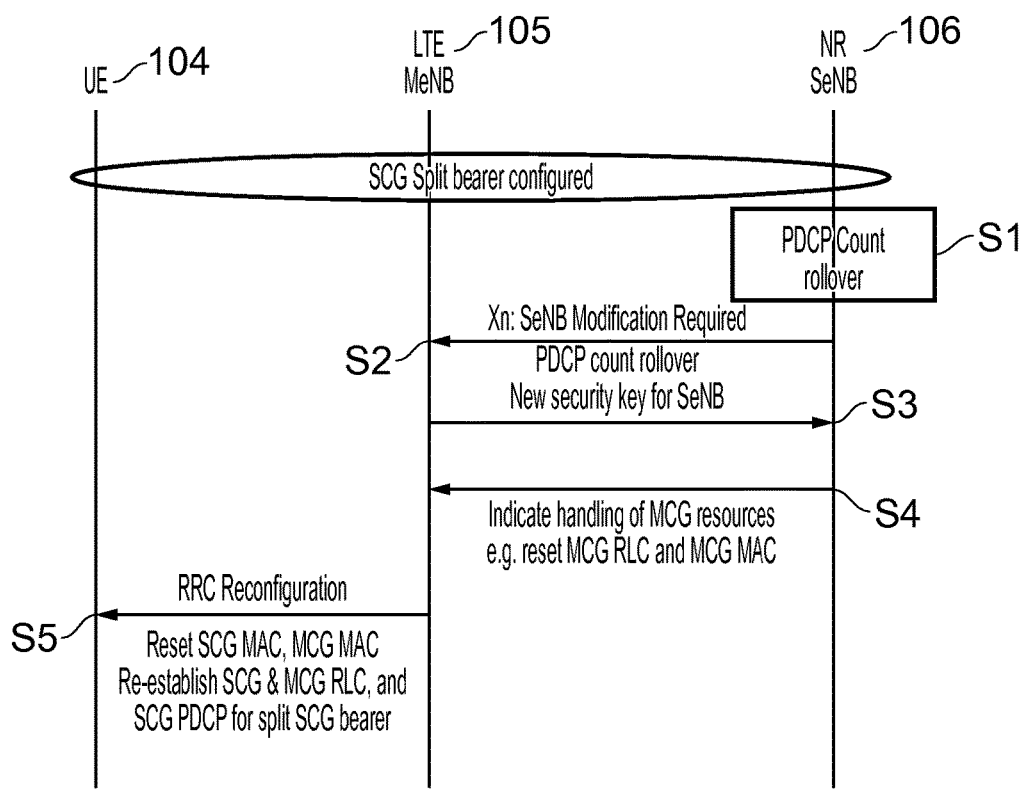
FIG. 7 shows a ladder diagram of steps in an example procedure for use following a protocol counter rollover in a secondary cell group within a network.

FIG. 7 shows a ladder diagram indicating steps in a first proposal of a method to achieve this. A network and its entities are configured for SCG split bearer use. For example, the entities comprise a UE 104, a MeNB 105 in a LTE architecture and a SeNB 106 in a NR architecture. In a first step S1, PDCP count rollover is recognised in the SeNB 106. In step S2, the SeNB 106 indicates to the MeNB 105 that PDCP rollover has occurred so that SeNB resource modification (reconfiguration) is required. In response, the MeNB 105 creates a new security key for the SeNB 106, and sends it to the SeNB 106 in step S3. Note that steps S1, S2 and S3 are the same as in the known SCG change procedure. Under the proposal, however, a next step S4 requires the SeNB 106 to additionally indicate to the MeNB 105 that handling (modification, reconfiguration) of the MCG resources relevant to the SCG split bearer is required, so that the MCG RLC and the MCG MAC are to be reset; the MeNB 105 performs this. Finally, in Step S5, the MeNB 105 carries out RRC reconfiguration of the UE 104. This also occurs in the SCG change procedure, in that the UE's SCG MAC is reset and its SCG RLC is re-established, but additionally here the UE's MCG MAC is reset and its MCG RLC is re-established (recall that the UE is provided with resources for both the MCG and the SCG for operation under dual connectivity, so it has two MAC entities, for example). The UE's SCG PDCP for the split SCG bearer is also re-established.

However, this solution presents issues in that resetting the MCG MAC will impact the SRBs and DRBs (signalling and data radio bearers) arriving at the MCG. There will be no issue regarding the RLC in the MeNB as there is a single instance of RLC per RB, but the MAC layer is configured for a whole cell group (MCG or SCG). Consequently, it would be preferable to avoid resetting the MAC. It is equivalent to moving the UE to RRC idle state, which is clearly problematic.

On the other hand, if the MCG MAC is not reset, one consequence is that there may be data packets (herein also "packets") in the MCG MAC HARQ buffer for the SCG split bearer which will halt a HARQ process or make it unusable. HARQ, or hybrid automatic repeat request, combines high-rate forward error correcting coding and ARQ error control, and is a process undertaken in the MAC, taking packets stored in the HARQ buffer. Resetting the MAC clears the buffer, and hence addresses any halt or unusability of a HARQ process. As a consequence, it is important to consider carefully the prospect of resetting or not resetting the MCG MAC to address an SCG PDCP count rollover.

A second proposal, alternative to that in FIG. 7 is to not reset the MCG MAC, and limit the handling of the MCG resources to a re-establishment of the MCG's RLC for SCG split bearer only. DRB release for conventional bearers does not involve a MAC reset, so omitting this procedure is feasible. Note however that it is assumed that there will be no packets queued in the HARQ for a bearer about to be released so that all processes continue as usual for the remaining DRBs.

A benefit of not resetting the MCG MAC for a SCG split bearer is that there will be no interruption of traffic on the MCG side of the link. However, there may be packets in the MCG MAC related to the SCG split bearer. An option to manage these is to continue with the transmission/reception until the HARQ processes have cleared, for example by setting a timer for the HARQ operation so that it is assumed to have cleared when the timer expires. Then, the MCG MAC discards any remaining packets related to the SCG split bearer after the MCG RLC has been re-established and the timer has expired (or the HARQ queue is otherwise empty or deemed empty).

For downlink traffic, one may arrange that the SCG PDCP stops sending packets to the MCG RLC well in advance of the MCG RLC re-establishment, so that the HARQ queue is empty before the RLC re-establishment is performed, or will be insufficiently full so as to certainly or near-certainly be able to empty during operation of the timer. Then there is no need to reset the MCG MAC. Under this regime, the UE may be notified well in advance that there is no requirement for its MCG MAC to be reset. For example, this information may be transmitted in a RRC/MAC/PHY layer message.

For the uplink, the network may reconfigure the UE with a split ratio for the SCG split bearer of zero percent for the MCG side of its resources (so that all split bearer traffic is diverted to the SCG side, thus avoiding the MCG side until regular operation after the count rollover has resumed). Alternatively, and similarly, the UE may be configured so that no uplink is granted on the MCG, again avoiding the MCG MAC during the critical time around count rollover.

Figure 8:
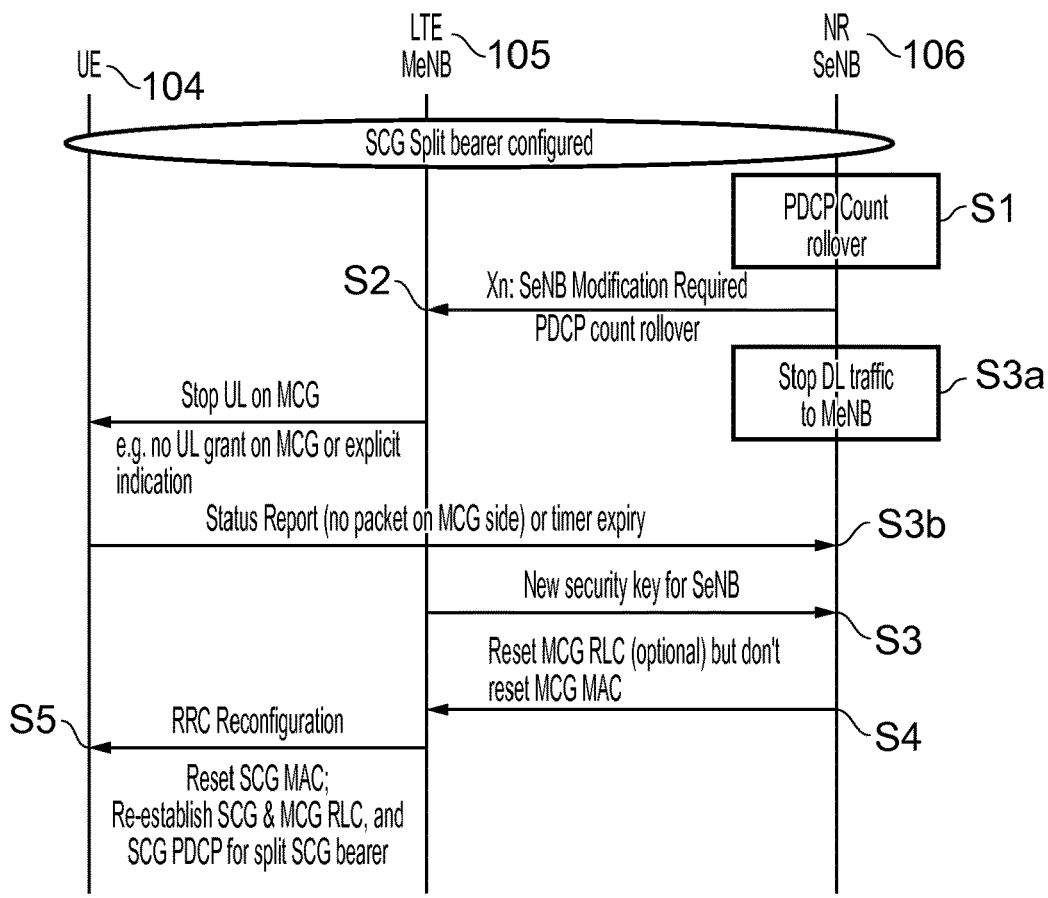
FIG. 8 shows a ladder diagram of steps in a further example procedure for use following a protocol counter rollover in a secondary cell group within a network.

FIG. 8 shows a ladder sequence of messages in an example procedure to implement the second proposal. The network is as in the FIG. 7 example, with a UE 104, a MeNB 105 and a SeNB 106 configured for SCG split bearer operation. Steps S1 and S2 are as in FIG. 8, but in this example, after the SeNB 106 notifies the MeNB 105 that modification is needed following a PDCP count rollover in step S2, in step S3a the SeNB 106 stops traffic to the MeNB 105, and also the MeNB 105 stops the UE's uplink on MCG resources (by no uplink grant or by an explicit indication, for example). Then, in step S3b, there is a status report to the SeNB regarding the data in the MAC HARQ buffer, for example that the timer described above has expired or that the buffer is empty (no packets in the MCG side MAC). Then the procedure moves to step S3 which is the same as before, namely the provision of a new security key to the SeNB. Step S4 is modified compared to FIG. 7, in that the SeNB 106 indicates a reset of the MCG RLC to the MeNB 105 but not an reset of the MCG MAC (this may be a definite instruction not to reset the MAC, or the absence of an instruction to do a reset). Finally, step S5 is similarly modified, in that the MeNB 105 performs an RRC reconfiguration of the UE 104, which includes re-establishment of the UE's MCG RLC, but does not include resetting of the UE's MCG MAC.

So, the SeNB may stop downlink traffic towards the MCG, in step S3a, and rely on flow control feedback to ensure there are no packets left in the MAC buffer, as in step S3b.

Regarding the uplink from the UE, in order to ensure there are no uplink packets in the MCG MAC of the UE which is designated for SCG split bearer, one may implement the following:

1. The network (that is, the MeNB or the SeNB) explicitly indicates that it will not provide grant for UL being scheduled on the MCG MAC of a SCG split bearer. For example, in dual connectivity operation, an eNB may configure a particular information element, IE (parameter in a signalling message such as RRC) as false to indicate that no traffic is sent via SCG. Currently, there is only an IE defined for this purpose for SCG traffic. It is therefore proposed to define a new IE that serves the same function for MCG, that is, a IE which when configured as false indicates that no traffic is to be sent via MCG. Alternatively, one can arrange the SCG split bearer so that the data split threshold can be set at 0 indicating no split so that all traffic is via the MCG or set at 100 indicating no split in the other direction so that all traffic is via the SCG. Use of a threshold of 100 would therefore remove traffic from the MCG as required. This procedure requires an additional RRC message being sent before the new key is provided, as in step S3a in FIG. 8.
2. In order to ensure there are no more packets left and all buffers are clear, the network may rely on:
   a. A buffer status report indicating the logical channel group (LCG) of the split bearer in the MCG. A UE is able to send a buffer status report indicating a buffer fill level for all channels in the LCG which is a group of uplink channels. This could be the status report in step S3b.
   b. An RLC (radio link control) status report being enhanced to indicate that no RLC service data unit is pending for transmission.
   c. Expiry of a timer, as discussed above.

Each of these options can be used as a reliable indicator from the UE to the SeNB that buffers in the UE MCG MAC are clear. One or other can be used in conjunction with stopping the uplink traffic as in paragraph 1 above.

3. Finally, after the new key is delivered to the SeNB in step S3, the UE is informed about the handling of resources, as described above with reference to FIG. 8.

A third proposal of a procedure to manage the SeNB PDCP rollover is that when the count rollover happens, the SeNB notifies this fact to the MeNB, and the MeNB moves the UE into a idle state, that is, the UE is moved to RRC idle. Alternatively, the SCG split bearer is released. In either case, traffic is no longer directed to the UE using the SCG split bearer, so inconsistencies between the SCG MAC and the MCG MAC are not liable to cause any problems.

In the event that in a given new radio (NR) architecture there is no RRC idle state, a fourth proposal is that the UE may instead be moved to a connected inactive state. This will have the same effect as a move to an idle state.

In a fifth proposal, in response to count rollover occurring or being about to occur in the SCG PDCP, the MeNB can perform an intra cell handover of the UE. The same RRC reconfiguration message might be used to effect the handover and to establish SCG split bearer. Mobility control information used for handover already includes resetting of MCG and SCG MAC, and associated RLC and PDCP handling and SCG configuration.

A sixth proposal is for the MeNB or the SeNB to change bearer type from SCG split bearer to SCG bearer before performing the SCG change on PDCP count rollover. Following the dual connectivity model, changing the bearer type also involves resetting of MCG MAC.

A seventh proposal is to not reset any resources, on either the MCG or the SCG. Instead, via RRC the UE is informed about the new key obtained for the SCG PDCP. Then the UE uses two keys (the old key and the new key) for some time before discarding the old key for decryption of received packets (so, when operating in downlink) when it is apparent that nothing is ciphered with the old key any longer. Other security input parameters could also be reset for the new key. The same behaviour might be employed in a new radio base station for uplink.

This proposal can be enhanced by use of a sequence number from the PDCP count which is designated as an activation sequence number. The network estimates a future sequence number that will be at a suitable time for the keys to be changed, and communicates it to the UE. Then, when this number is reached in the ciphering, both the network and the UE can synchronise the changeover from the old key to the new key. Alternatively, an activation sequence number may be designated from the sequence of numbers from a count in the RLC layer. The PDCP sequence number may become unreliable as it approaches rollover, so use of the RLC count avoids such problems; it is unlikely that both count values will rollover at the same time.

As an eighth proposal, one can add an additional parameter as an input to the security algorithm implemented by the SeNB SCG split bearer to perform ciphering. The additional parameter is added in when the count rolls over, as a way of effectively extending the count by allowing repeated sequence numbers to be recycled as "new" numbers by the inclusion of the additional parameter. A different additional parameter might be added at each count rollover, or the additional parameter might be replaced by a different additional parameter at each count rollover. Following this option, no resource on the MCG side or the SCG side needs to be reset.

An example new parameter is a new counter which is taken in account while generating encryption and integrity keys. Currently, integrity protection is enabled on SRBs, and it is unlikely that a SRB count would roll over. RRC message PDUs (protocol data unit, the output of a protocol layer to another) are not as frequent as data transmission PDUs in PDCP.

Another example is to add a new bit to the packet header when rollover occurs, thus making the combination unique and allowing all existing numbers from the counter to be used again, each with the new bit.

A further example is to send in the packet header a bitmap related to both the old key or keys and the new key or keys.

Some of the alternative proposals presented above rely on various assumptions about the network and its operation and architecture. For example, it is assumed that the S1-MME protocol layer (see FIG. 2) will still be terminated in the MeNB for LTE-NR interworking. Also, that security keys for SeNB will be derived from KeNB in the MeNB using existing dual connectivity procedures (see supply of the new key to the SeNB in FIGS. 7 and 8). However, security keys may be provided to the NR PDCP directly from S1-MME for the SCG split bearer. If so, the core network would need to be involved in provision of the new key.

It has been assumed that the procedures described herein are triggered by the SeNB. However, the various proposal and techniques for resource handling are also applicable in the case of initiation by the MeNB.

We have assumed also that SCG resources related to the SCG split bearer will be reset or re-established. However, if the MCG side can survive without reset then the SCG side of resources can be saved from reset also.

In an LTE-NR interworking scenario, the various proposals are equally valid if the NR is the master instead of the LTE, except if the RLC entity is not agreed as part of the NR protocol stack, in which case the MCG RLC becomes irrelevant.

The proposals consider a single RRC entity in the LTE MeNB. However, each proposal is applicable regardless of the number of RRC entities or state machines, or the way RRC messages may be transported over NR (using L2 protocol stacks from MCG or SCG).

While the invention has been presented in terms of PDCP count rollover, the proposals may also be applied in situations where the rollover or expiry of any parameter will risk or prevent the uniqueness of security algorithm input parameters being maintained. For example, ciphering may rely on a key which is time-sensitive, so that expiry of the key is the trigger for the various procedures.

Note that SCG may operate in licensed or unlicensed bands.

Thus far, we have considered issues arising from PDCP rollover and the subsequent key change from the SCG change procedure in the context of SCG split bearers used in a dual connectivity arrangement such as LTE-NR interworking. Within the same framework, we can also consider a further change procedure which can have similar implications regarding resource reconfiguration. This is a PSCell change procedure.

Recall the network comprising a master cell group MCG and a secondary cell group SCG, respectively under control of a master eNB, MeNB, and a secondary eNB, SeNB. Within each group, we can designate a primary cell. So, the MCG has a primary cell PCell, and the SCG has a primary cell, the PSCell for primary secondary cell. The PSCell handles or controls uplink signalling within the cells of the SCG and the PCell handles or controls uplink signalling within the cells of the MCG. Any additional cells in the MCG are called secondary cells, Scells, while any additional cells in the SCG are called secondary secondary cells, SSCells.

Figure 9:
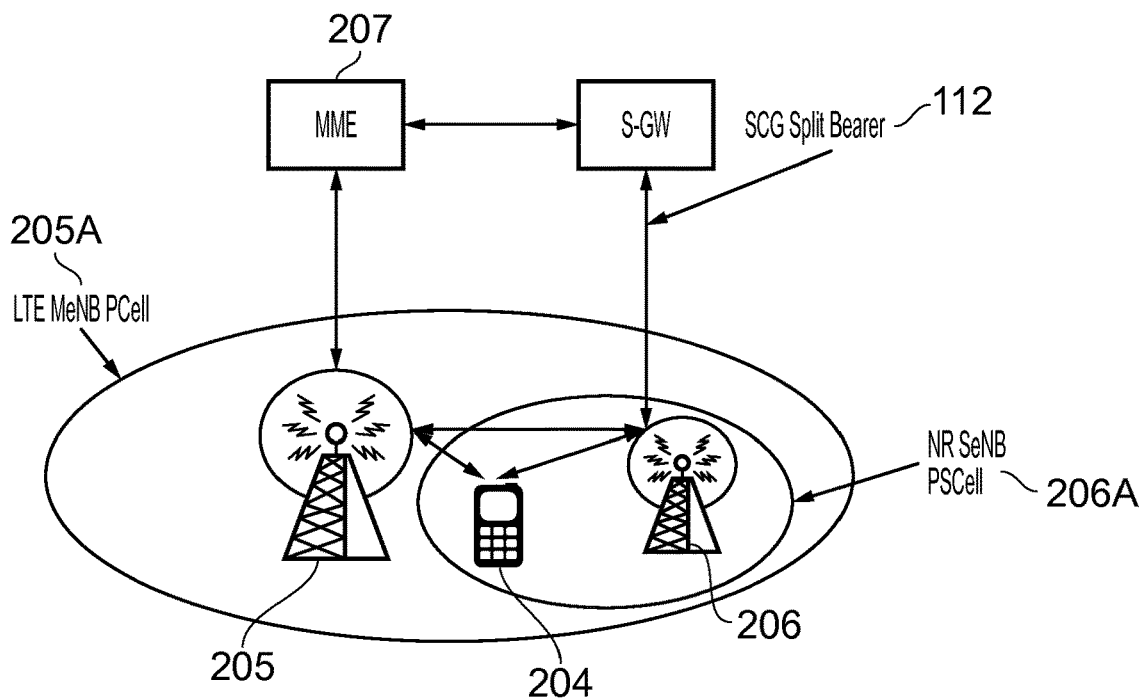
FIG. 9 shows a schematic representation of base stations and user equipment arranged using primary cells within cell groups.

FIG. 9 shows a schematic representation of such a network. The core network MME 207 supports a MeNB 205 which provides a PCell 205A. In this example the LTE provides the master. New radio NR provides the secondary, so that a secondary SeNB provides a PSCell 206A. SCells and SS Cells are not shown for clarity. A user equipment 204 communicates with both the MeNB 205 and the SeNB 206. A SCG split bearer 112 is used to deliver data to the SeNB, where the split bearer 112 is divided between the resources of the SeNB and the MeNB before being transported by each base station to the user equipment 204, as before.

The PSCell is able to be changed, so that a different cell in the SCG becomes the primary, i.e. a SSCell becomes the new PSCell and the original PSCell becomes a SSCell. In dual connectivity, this change also triggers the SCG change procedure discussed above (and depicted in FIG. 6). Cells in a NR SCG have a small size, owing to operation at higher radio frequencies for NR compared to LTE, so mobility of entities will lead to frequent PSCell changes. Note that PCell change is also possible.

Various factors have relevance when considering how to manage a PSCell change. In this scenario, the physical uplink control channel PUCCH on the SCG is configured on the PSCell. Physical channel reconfiguration is required when a new cell takes the role of a PSCell, so that PUCCH resources are configured on the new PSCell, if previously not configured. PUCCH resources are not configured for all SCells in LTE. NR may follow the same principle, or may allow a PUCCH-like control channel on all configured SCells. Both the possibilities are within the current scope.

In dual connectivity, there is no linkage between the SKeNB key and the SCG counter, and the PSCell identity (ID). So, PSCell change is independent of SCG security. Conversely, the PCell Cell ID is used for KeNB calculation and NAS (non-access stratum) information is taken from the PCell (standard 36.300 section 7.5). Hence, PSCell change and PCell change procedures can differ from security point of view; there is no requirement for the procedures to be the same.

During SCG change, the SKeNB key is refreshed as described above. For NR, it is possible that handover and security procedures may be separated, so in the future, PSCell change (for handover or caused by mobility) may be performed without a SKeNB change.

The random access (RA) procedure, by which a UE accesses the network, is run on the PSCell. RA procedure requires new time alignment, so there has been a requirement to reset resources during the dual connectivity PSCell change procedure. However, a RACH (random access channel)-less handover procedure where source and target cells are synchronized has recently been proposed, so that in the future the RA procedure may not always be required, or if required have no associated resource reset Radio Link Monitoring is performed on the PSCell. A change in RLM configuration is required at PSCell change.

Uplink thresholds for traffic separation between the MCG and the SCG are configured in PDCP and these thresholds are provided by the LTE eNB.

In the context of NR, one may assume, in some cases, a radio access network (RAN) in which multiple data or distribution units (DU) are connected to a single control unit (CU) to provide the secondary cell group. Change of the PSCell is effected by allocating a different DU to provide the PSCell. Therefore, one can consider how to perform a PSCell change for non-standalone for a SCG split bearer, with multiple DUs connected to a CU on the NR, secondary, side.

PSCell change in dual connectivity is handled by the SCG change procedure, described above.

Figure 10:
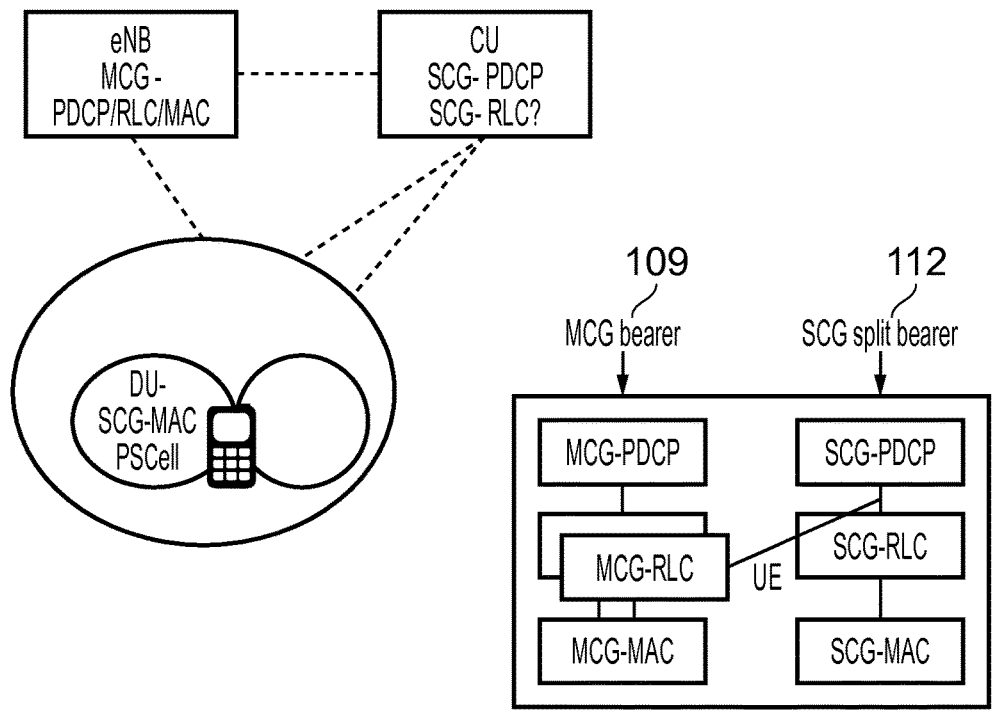
FIG. 10 shows a schematic representation of an example protocol stack for LTE-NR interworking with a split bearer.

FIG. 10 shows a schematic representation of the protocol instances for LTE-NR tight internetworking in an example case where a UE is connected to a LTE macro and to a SeNB DU. LTE is the master and NR is SeNB. In this example, protocol stacks for two bearers are shown, the MCG bearer 109 and SCG split bearer 112. The MCG bearer 109 has associated PDCP and RLC entities. The SCG split bearer 112 has resources in the CU of SCG PDCP, SCG RLC and SCG MAC. Owing to the split, it also has RLC resources in the MCG side. The MCG MAC is common for both the bearers, and handles the MCG bearer and the part of the SCG split bearer which is passed to the MCG by the SCG PDCP, as before.

In the earlier scenario, the SCG change procedure was triggered by the SCG PDCP counter rolling over, requiring a new key for the SCC PDCP and hence incompatibility between resources for the SCG split bearer on the SCG side and resources for the other part of the SCG split bearer on the MCG side.

In the current scenario, the SCG change procedure is triggered by a PSCell change. This gives a new SCG PDCP (with a different key and other ciphering algorithm parameters) on the SCG side, again giving incompatibilities between resources for the SCG split bearer on the SCG and the MCG side.

Owing to similarities in the two situations, one can apply various of the proposals outlined above for PDCP count rollover to the PSCell change situation. In particular, each of the first, second, third, fourth and fifth proposals is readily applicable to dealing with PSCell change. Hence, rather than the SCG split bearer PDCP count rollover in the SeNB being the trigger for the various methods of resource handling and management, the PSCell change is the trigger (arising, for example, from entity mobility requiring a different cell in the SCG being designated as the PSCell).

Other methods are also proposed to address the PSCell change situation. A dual connectivity SCG change procedure results in PDCP re-establishment, with the associated implication that the MCG RLC and MCG MAC need to be re-established and reset, leading to SRB disruption (as discussed above). However, considering LTE-WLAN aggregation whereby security and mobility procedures are separated, and a future C-RAN architecture of NR such as in FIG. 10, PDCP re-establishment may not be necessary for PSCell change.

Figure 10A:
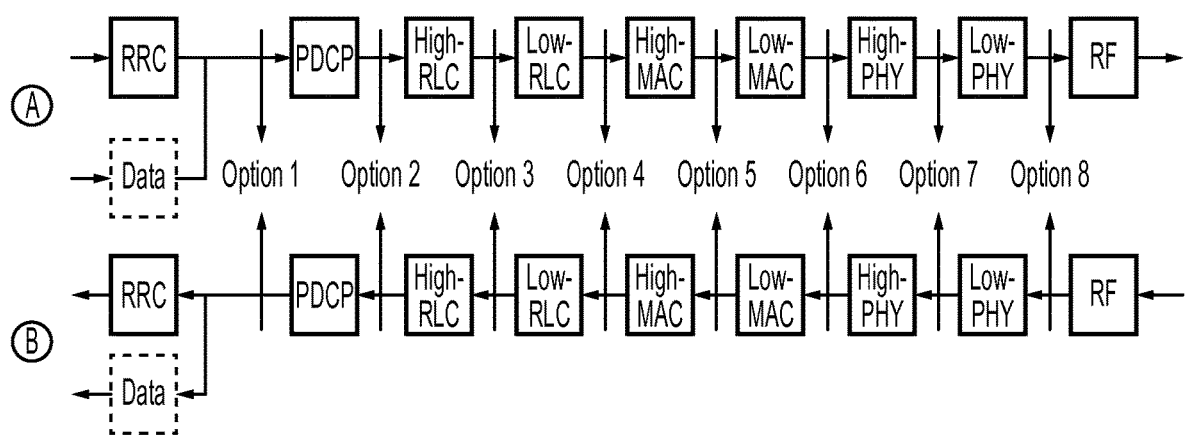
FIG. 10A shows a diagrammatic representation of example options for handling a split bearer between entity resources.

The FIG. 10 example is one possibility for a future architecture of centralised deployment, in which the SCG split bearer is divided after handling by the receiving PDCP. Other options are outlined in the 3GPP standard specification TR 38.801 covering non-centralised deployment (like the LTE architecture) and co-sited deployment (with LTE). FIG. 10a shows a diagrammatic representation of possible options for the splitting of bearers to be shared between resources. For both uplink and downlink, the split (for RRC and data) could be arranged at any of the successive protocol layers, so that bearer handling can be shared between two sets of resources A and B. Hence, various options 1 to 8 are contemplated, respectively for splitting before PDCP (or after for the opposite link direction), between PDCP and high level RLC, between high level RLC and low level RLC, between low level RLC and high level MAC, between high level MAC and low level MAC, between low level MAC and high level PHY (physical layer), between high level PHY and low level PHY, or between low level PHY and RF.

Hence one can consider further the alternatives of both PDCP re-establishment and PDCP maintenance when addressing the issues of resource handling for PSCell change.

Firstly, consider that the PDCP in the SCG is to be maintained.

A proposed approach is that, assuming PDCP is not re-established for PSCell change within a CU, the PDCP stops sending the traffic to the RLC protocol layers in both the SCG and the MCG. Information exchange between the UE and the network may be necessary in order to ensure that both sides are time-synchronised.

Figure 11:
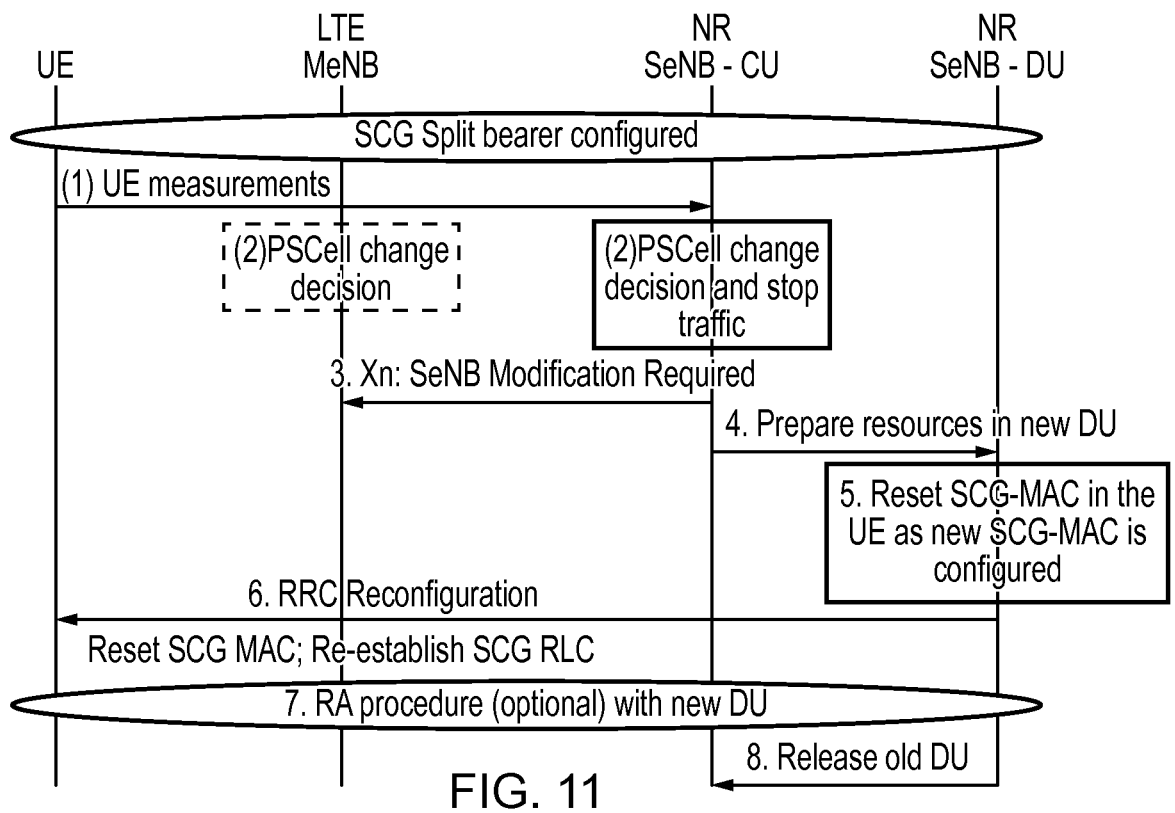
FIG. 11 shows a ladder diagram of steps in an example procedure for use in the event of a primary secondary cell change.

FIG. 11 shows a ladder diagram of steps (message sequence) in an example of such a method. The network includes a UE, a MeNB in LTE, and CU and DU SeNBs in NR. Firstly, the RRC entity(ies) in the MeNB or SeNB decide based on measurements that a PSCell change is required. UE measurements are reported to either a) MeNB or b) SeNB directly or c) received by MeNB and forwarded to SeNB over the X2New interface. Particular values of or changes in the measurements, such as those caused by UE mobility, can indicate a requirement for a new PSCell. Then the RRC informs the PDCP and RLC/MAC about the PSCell change decision, and may ask to stop the traffic. If SeNB is the entity which makes a decision about PSCell change, then SeNB RRC informs the MeNB (MCG-RLC, MCG MAC) over X2 and the UE over RRC. The UE RRC internally informs PDCP and RLC/MAC entities about PSCell change. Next, the SCG-PDCP entity in the UE (for the uplink) and in the SeNB (for the downlink) stops traffic towards both the MCG and SCG. This is for the purpose of obtaining an empty HARQ buffer in the MAC, and can be implemented as discussed previously under the second proposal for the first scenario, by configuring uplink thresholds and informing MeNB for downlink traffic, and receiving feedback from both the MeNB and the UE when buffers are empty. Then, the SCG RLC entities in the UE and the SeNB are re-established and the SCG MAC is reset. The PDCP is informed once it is complete. Finally, the PDCP restarts the traffic and may inform RRC about the completion of the procedure. If reordering function is in the PDCP only then NR-RLC (SCG-RLC in this example) may also not need a reset.

Figure 12:
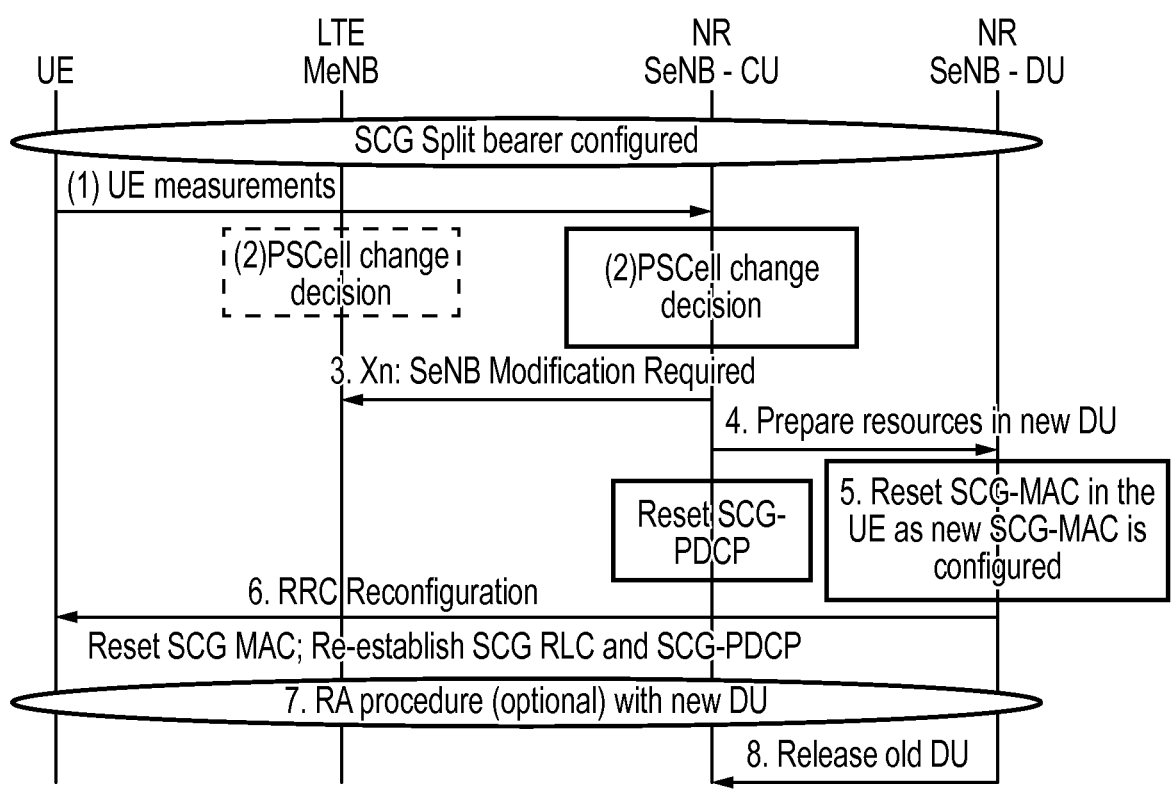
FIG. 12 shows a ladder diagram of steps in a further example procedure for use in the event of a primary secondary cell change.

In an alternative in which the PDCP is re-established, PSCell change is handled locally within the SeNB but an explicit indication is necessary for the UE and MeNB such that it does not result in resetting of MCG MAC. This proposal assumes that PDCP is re-established. FIG. 12 shows a ladder diagram of steps (message sequence) in an example of such a method. Comparison with FIG. 11 shows that the methods are the same except for re-establishment of the SCG PDCP. A different RRC reconfiguration message for the UE is needed, to instruct re-establish of the SCG PDCP in the UE. Stopping of traffic is still required since the MCG-MAC is not to be reset.

As a final proposal, we consider a situation in which the SCG MAC in the NR side is not reset. One difference compared to above is that the SCG MAC has always been assumed to be reset because the assumption taken is that one DU controls a single cell, and a single MAC entity exists per DU. However, multiple cells may share a single MAC entity (scheduler), and UE NR SCG-MAC is able to support multiple cells. If both source and target cell are controlled by the same MAC-DU then cell change may take place via MAC level signalling. Alternatively, HARQ processes are separated per bearer in NR MAC, so resetting the resources specific to one bearer does not impact others.

This implies no traffic stopping procedure between the UE, MeNB and SeNB, a difference from the FIGS. 11 and 12 examples. Also, there is no need for RRC/X2 signalling related to a traffic stop/start, and reset are expected. The SeNB changes the cell internally, taking measurements or any other internal criteria (e.g. load balancing on uplink/downlink control channels) into account, and uses MAC control element or physical layer signalling or similar means (e.g. RLC or PDCP control PDU) to notify the UE. The change of cells is expected to be quick enough that no interruption is noticeable on the MCG side and all entities are kept without reset or interruption. This is an improvement compared to the schemes of FIGS. 11 and 12.

These examples may also be applied for mobility within a NR MCG as well.

We have assumed in these examples that LTE is the master and NR is the secondary. For a deployment where NR is master and LTE is secondary, it is assumed that NR CU-DU split may happen and LTE may or may not support C-RAN architecture. No difference is foreseen between the two cases.

There has been described a method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; the method comprising: when the secondary base station exhausts a supply of unique parameter sets used in security ciphering of received split radio bearers, the secondary base station sends a notification to the master base station of a requirement to alter data handling resources allocated for handling split radio bearers received from the secondary base station in one or both of the master base station and the terminal device; and the master base station, in response to the notification, operating to effect an alteration in the said data handling resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; the method comprising: when the secondary base station exhausts a supply of unique parameter sets used in security ciphering of received split radio bearers, the secondary base station sends a notification to the master base station of a requirement to alter data handling resources allocated for handling split radio bearers received from the secondary base station in one or both of the master base station and the terminal device; and the master base station, in response to the notification, operates to effect an alteration in the said data handling resources.

Paragraph 2. The method of paragraph 1, in which the parameter sets are made unique by inclusion of successive numbers from a counter in a packet data convergence protocol that receives, ciphers and splits the split radio bearer, and exhaustion of the supply of unique parameter sets occurs when the counter rolls over from its final number back to its starting number.

Paragraph 3. The method of paragraph 1 or paragraph 2, in which: the master base station effects the alteration in said data handling resources by re-establishing its radio link control protocol layer and resetting its medium access control protocol layer, and sending a reconfiguration message to the terminal device to effect re-establishment of its radio link control protocol layer and resetting of its medium access control protocol layer.

Paragraph 4. The method of paragraph 1 or paragraph 2, in which: the master base station effects the alteration in said data handling resources by re-establishing its radio link control protocol layer and not resetting its medium access control protocol layer, sending a reconfiguration message to the terminal device to effect re-establishment of its radio link protocol layer but not resetting of its medium access control layer.

Paragraph 5. The method of paragraph 4, further comprising: arranging that a hybrid automatic repeat request buffer in the medium access control protocol of the said data handling resources in the master base station is empty before re-establishing its radio link control layer.

Paragraph 6. The method of paragraph 5, in which arranging for the buffer to be empty includes stopping downlink data traffic to the master base station for a predetermined time period following exhaustion of the supply of unique parameter sets.

Paragraph 7. The method of paragraph 5, in which arranging for the buffer to be empty includes stopping uplink data traffic to the master base station for a predetermined time period following exhaustion of the supply of unique parameter sets.

Paragraph 8. The method of any one of paragraphs 5 to 7, further comprising sending a status report to the secondary base station to indicate an empty status of the buffer, before the secondary base station sends the notification to the master base station.

Paragraph 9. The method of paragraph 1 or paragraph 2, in which the master base station effects the alteration in said data handling resources by placing the terminal device into a state in which its said data handling resources can no longer handle the split radio bearers.

Paragraph 10. The method of paragraph 9, in which placing the terminal device into a state comprises moving the terminal device to an idle radio communication mode.

Paragraph 11. The method of paragraph 9, in which placing the terminal device into a state comprises releasing the terminal device from connection with the split radio bearers.

Paragraph 12. The method of paragraph 9, in which placing the terminal device into a state comprises moving the terminal device to an inactive connected radio communication mode.

Paragraph 13. The method of paragraph 9, in which placing the terminal device into a state comprises performing an intracell handover of the terminal device.

Paragraph 14. The method of paragraph 1 or paragraph 2, in which the master base station effects the alteration in said data handling resources by resetting its medium access control layer as part of a procedure in which one of the master base station or the secondary base station changes the type of radio bearer it handles away from the said split radio bearer.

Paragraph 15. A method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; the method comprising: when the secondary base station exhausts a supply of unique parameter sets used in security ciphering of received split radio bearers, the unique parameter sets each including a first key, the secondary base station is provided with a second key to create a new supply of unique parameter sets, the second key is communicated to the terminal device, and the terminal device uses both the first key and the second key for handling the split radio bearer until it determines that the first key is redundant.

Paragraph 16. A method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station; and and a terminal device configured to communicate wirelessly with the base stations including by the use of a split radio bearer receivable at the secondary base station for splitting between the secondary base station and the master base station before delivery to the terminal device; the method comprising: when the secondary base station exhausts a supply of unique parameter sets used in security ciphering of received split radio bearers, a new parameter is introduced and added to each parameter set to create a new supply of unique parameter sets.

Paragraph 17. A wireless telecommunications network comprising: a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; wherein the wireless telecommunications network is configured to carry out the method of any one of paragraphs 1 to 16.

Paragraph 18. A method of operating a base station in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; where the base station is a secondary base station, the method comprising: when the secondary base station exhausts a supply of unique parameter sets used in security ciphering of received split radio bearers, the secondary base station sends a notification to the master base station of a requirement to alter data handling resources allocated for handling split radio bearers received from the secondary base station in one or both of the master base station and the terminal device.

Paragraph 19. A base station for use in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; wherein the base station is a secondary base station, and comprises a controller unit and a transceiver unit and is configured to provide wireless connectivity within the cells of the secondary cell group, and is configured to: send a notification to the master base station of a requirement to alter data handling resources allocated for handling split radio bearers received from the secondary base station in one or both of the master base station and the terminal device, when the secondary base station exhausts a supply of unique parameter sets used in security ciphering of received split radio bearers.

Paragraph 20. Integrated circuitry for a base station for use in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; wherein the base station is a secondary base station, and the integrated circuitry comprises a controller element and a transceiver element and is configured to: enable the secondary base station to provide wireless connectivity within the cells of the secondary cell group; and send a notification to the master base station of a requirement to alter data handling resources allocated for handling split radio bearers received from the secondary base station in one or both of the master base station and the terminal device, when the secondary base station exhausts a supply of unique parameter sets used in security ciphering of received split radio bearers.

Paragraph 21. A method of operating a base station in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; where the base station is a master base station, the method comprising: receiving at the master base station a notification sent by secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device; and in response to the notification, the master base station operating to effect an alteration in the said data handling resources.

Paragraph 22. A base station for use in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; wherein the base station is a master base station, and comprises a controller unit and a transceiver unit and is configured to provide wireless connectivity within the cells of the master cell group, and is configured to: receive a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device; and in response to the notification, effect an alteration in the said data handling resources.

Paragraph 23. Integrated circuitry for a base station for use in a wireless telecommunications network which comprises a core network; base stations supported by the core network and each providing wireless connectivity within at least one base station cell where the cells are arranged into a master cell group under control of a master base station and a secondary cell group under control of a secondary base station; and a terminal device configured to communicate wirelessly with the base stations including by the use of a split radio bearer receivable at the secondary base station for splitting between the secondary base station and the master base station before delivery to the terminal device; wherein the base station is a master base station, and the integrated circuitry comprises a controller element and a transceiver element and is configured to: enable the master base station to provide wireless connectivity within the cells of the master cell group; and receive a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device; and in response to the notification, effect an alteration in the said data handling resources.

Paragraph 24. A method of operating a terminal device in a wireless telecommunications network which comprises a core network; base stations supported by the core network and each providing wireless connectivity within at least one base station cell where the cells are arranged into a master cell group under control of a master base station and a secondary cell group under control of a secondary base station; and the terminal device configured to communicate wirelessly with the base stations including by the use of a split radio bearer receivable at the secondary base station for splitting between the secondary base station and the master base station before delivery to the terminal device; the method comprising: effecting an alteration in data handling resources of the terminal device which are allocated for handling split ratio radio bearers received from the secondary base station in response to a reconfiguration message sent by the master base station to the terminal device in response to receipt by the master base station of a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device.

Paragraph 25. A terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station; and the terminal device: wherein the terminal device comprises a controller unit and a transceiver unit and is configured to: communicate wirelessly with the base stations including by the use of a split radio bearer receivable at the secondary base station for splitting between the secondary base station and the master base station before delivery to the terminal device; and effect an alteration in data handling resources of the terminal device which are allocated for handling split ratio radio bearers received from the secondary base station in response to a reconfiguration message sent by the master base station to the terminal device in response to receipt by the master base station of a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device.

Paragraph 26. Integrated circuitry for a terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station; and the terminal device: wherein the integrated circuitry comprises a controller element and a transceiver element and is configured to: enable the terminal device to communicate wirelessly with the base stations including by the use of a split radio bearer receivable at the secondary base station for splitting between the secondary base station and the master base station before delivery to the terminal device; and effect an alteration in data handling resources of the terminal device which are allocated for handling split ratio radio bearers received from the secondary base station in response to a reconfiguration message sent by the master base station to the terminal device in response to receipt by the master base station of a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device.

Paragraph 27. A method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell with responsibility for uplink control signalling in the secondary cell group; and a terminal device configured to communicate wirelessly with the base stations including by the use of a split radio bearer receivable at the secondary cell group via the primary secondary cell for splitting between the secondary base station and the master base station before delivery to the terminal device; the method comprising: in the event of a need to change the designation of the primary secondary cell to a different cell in the secondary cell group, the secondary base station sends a notification to the master base station of a requirement to alter data handling resources allocated for handling split radio bearers received from the secondary base station in one or both of the master base station and the terminal device; and the master base station, in response to the notification, operates to effect an alteration in the said data handling resources.

Paragraph 28. The method of paragraph 27, in which the master cell group and the master base station are configured within a Long Term Evolution radio access network, and the secondary base station is a core unit associated with distributed units providing the cells of the secondary cell group, the core unit and the distributed units configured under a different radio access network, the master cell group and the secondary cell group interworking to provide the wireless telecommunications network.

Paragraph 29. The method of paragraph 27 or paragraph 28, in which: the master base station effects the alteration in said data handling resources by re-establishing its radio link control protocol layer and resetting its medium access control protocol layer, and sending a reconfiguration message to the terminal device to effect re-establishment of its radio link control protocol layer and resetting of its medium access control protocol layer.

Paragraph 30. The method of paragraph 27 or paragraph 28, in which: the master base station effects the alteration in said data handling resources by re-establishing its radio link control protocol layer and not resetting its medium access control protocol layer, sending a reconfiguration message to the terminal device to effect re-establishment of its radio link protocol layer but not resetting of its medium access control layer.

Paragraph 31. The method of paragraph 30, further comprising: arranging that a hybrid automatic repeat request buffer in the medium access control protocol of the said data handling resources in the master base station is empty before re-establishing its radio link control layer.

Paragraph 32. The method of paragraph 31, in which arranging for the buffer to be empty includes stopping downlink data traffic to the master base station for a predetermined time period following exhaustion of the supply of unique parameter sets.

Paragraph 33. The method of paragraph 31, in which arranging for the buffer to be empty includes stopping uplink data traffic to the master base station for a predetermined time period following exhaustion of the supply of unique parameter sets.

Paragraph 34. The method of any one of paragraphs 31 to 33, further comprising sending a status report to the secondary base station to indicate an empty status of the buffer, before the secondary base station sends the notification to the master base station.

Paragraph 35. The method of paragraph 27 or paragraph 28, in which the master base station effects the alteration in said data handling resources by placing the terminal device into a state in which its said data handling resources can no longer handle the split radio bearers.

Paragraph 36. The method of paragraph 35, in which placing the terminal device into a state comprises moving the terminal device to an idle radio communication mode.

Paragraph 37. The method of paragraph 35, in which placing the terminal device into a state comprises releasing the terminal device from connection with the split radio bearers.

Paragraph 38. The method of paragraph 35, in which placing the terminal device into a state comprises moving the terminal device to an inactive connected radio communication mode.

Paragraph 39. The method of paragraph 35, in which placing the terminal device into a state comprises performing an intracell handover of the terminal device.

Paragraph 40. The method of paragraph 27 or paragraph 28, in which the master base station effects the alteration in said data handling resources by resetting its medium access control layer as part of a procedure in which one of the master base station or the secondary base station changes the type of radio bearer it handles away from the said split radio bearer.

Paragraph 41. A method for use in a wireless telecommunications network, the mobile telecommunications network comprising: a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell, and the master cell group and the master base station are configured within a Long Term Evolution radio access network, and the secondary base station is a core unit associated with distributed units providing the cells of the secondary cell group, the core unit and the distributed units configured under a different radio access network, the master cell group and the secondary cell group interworking to provide the wireless telecommunications network; and a terminal device configured to communicate wirelessly with the base stations including by the use of a split radio bearer receivable at the secondary cell group via the primary secondary cell for splitting between the secondary base station and the master base station before delivery to the terminal device; the method comprising: in the event of a need to change the designation of the primary secondary cell from a first cell to a second cell in the secondary cell group when the first cell and the second cell are both provided by a same distributed unit so that the first cell and the second cell share a common medium access control protocol layer, the change of the primary secondary cell from the first cell to the second cell is performed using signalling in the common medium access control protocol layer.

Paragraph 42. A wireless telecommunications network comprising: a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group via the primary secondary cell for splitting between the secondary base station and the master base station before delivery to the terminal device; wherein the wireless telecommunications network is configured to carry out the method of any one of paragraphs 27 to 41.

Paragraph 43. A method of operating a base station in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group via the primary secondary cell for splitting between the secondary base station and the master base station before delivery to the terminal device; where the base station is a secondary base station, the method comprising: when a need arises to change the designation of the primary secondary cell to a different cell in the secondary cell group, the secondary base station sends a notification to the master base station of a requirement to alter data handling resources allocated for handling split radio bearers received from the secondary base station in one or both of the master base station and the terminal device.

Paragraph 44. A base station for use in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group for splitting between the secondary base station and the master base station before delivery to the terminal device; wherein the base station is a secondary base station, and comprises a controller unit and a transceiver unit and is configured to provide wireless connectivity within the cells of the secondary cell group, and is configured to: send a notification to the master base station of a requirement to alter data handling resources allocated for handling split radio bearers received from the secondary base station in one or both of the master base station and the terminal device, when a need arises to change the designation of the primary secondary cell to a different cell in the secondary cell group.

Paragraph 45. Integrated circuitry for a base station for use in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group for splitting between the secondary base station and the master base station before delivery to the terminal device; wherein the base station is a secondary base station, and the integrated circuitry comprises a controller element and a transceiver element and is configured to: enable the secondary base station to provide wireless connectivity within the cells of the secondary cell group; and send a notification to the master base station of a requirement to alter data handling resources allocated for handling split radio bearers received from the secondary base station in one or both of the master base station and the terminal device, when a need arises to change the designation of the primary secondary cell to a different cell in the secondary cell group.

Paragraph 46. A method of operating a base station in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group for splitting between the secondary base station and the master base station before delivery to the terminal device; where the base station is a master base station, the method comprising: receiving at the master base station a notification sent by secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device; and in response to the notification, the master base station operating to effect an alteration in the said data handling resources.

Paragraph 47. A base station for use in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group for splitting between the secondary base station and the master base station before delivery to the terminal device; wherein the base station is a master base station, and comprises a controller unit and a transceiver unit and is configured to provide wireless connectivity within the cells of the master cell group, and is configured to: receive a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device; and in response to the notification, effect an alteration in the said data handling resources.

Paragraph 48. Integrated circuitry for a base station for use in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and a terminal device configured to communicate wirelessly with the base stations including by the use of a split radio bearer receivable at the secondary cell group for splitting between the secondary base station and the master base station before delivery to the terminal device; wherein the base station is a master base station, and the integrated circuitry comprises a controller element and a transceiver element and is configured to: enable the master base station to provide wireless connectivity within the cells of the master cell group; and receive a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device; and in response to the notification, effect an alteration in the said data handling resources.

Paragraph 49. A method of operating a terminal device in a wireless telecommunications network which comprises a core network; base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell; and the terminal device configured to communicate wirelessly with the base stations including by the use of a split radio bearer receivable at the secondary cell group for splitting between the secondary base station and the master base station before delivery to the terminal device; the method comprising: effecting an alteration in data handling resources of the terminal device which are allocated for handling split ratio radio bearers received from the secondary base station in response to a reconfiguration message sent by the master base station to the terminal device in response to receipt by the master base station of a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device.

Paragraph 50. A terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station wherein in the secondary cell group one cell is designated as a primary secondary cell; and the terminal device: wherein the terminal device comprises a controller unit and a transceiver unit and is configured to: communicate wirelessly with the base stations including by the use of a split radio bearer receivable at the secondary cell group for splitting between the secondary base station and the master base station before delivery to the terminal device; and effect an alteration in data handling resources of the terminal device which are allocated for handling split ratio radio bearers received from the secondary base station in response to a reconfiguration message sent by the master base station to the terminal device in response to receipt by the master base station of a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device.

Paragraph 51. Integrated circuitry for a terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station wherein in the secondary cell group one cell is designated as a primary secondary cell; and the terminal device: wherein the integrated circuitry comprises a controller element and a transceiver element and is configured to: enable the terminal device to communicate wirelessly with the base stations including by the use of a split radio bearer receivable at the secondary cell group for splitting between the secondary base station and the master base station before delivery to the terminal device; and effect an alteration in data handling resources of the terminal device which are allocated for handling split ratio radio bearers received from the secondary base station in response to a reconfiguration message sent by the master base station to the terminal device in response to receipt by the master base station of a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device.

REFERENCES

[1] Holma H. and Toskala A, "LTE for UMTS OFDMA and SC-FDMA based radio access", John Wiley and Sons, 2009

What is claimed is:

1. A method for use in a wireless telecommunications network, the mobile telecommunications network comprising:
   a core network;
   base stations supported by the core network and each providing wireless connectivity within at least one base station cell where the cells are arranged into a master cell group under control of a master base station and a secondary cell group under control of a secondary base station; and
   a terminal device configured to communicate wirelessly with the base stations including by the use of a split radio bearer receivable at the secondary base station for splitting between the secondary base station and the master base station before delivery to the terminal device; the method comprising:
   in a case that the secondary base station exhausts a supply of unique parameter sets used in security ciphering of received split radio bearers, the secondary base station sends a notification to the master base station of a requirement to alter data handling resources allocated for handling split radio bearers received from the secondary base station in one or both of the master base station and the terminal device; and
   the master base station, in response to the notification, operates to effect an alteration in the said data handling resources by placing the terminal device into a state in which its data handling resources can no longer handle the split radio bearers.

2. The method of claim 1, wherein
   the parameter sets are made unique by inclusion of successive numbers from a counter in a packet data convergence protocol that receives, ciphers and splits the split radio bearer, and exhaustion of the supply of unique parameter sets occurs when the counter rolls over from its final number back to its starting number.

3. The method of claim 1, wherein
   the master base station effects the alteration in said data handling resources by re-establishing its radio link control protocol layer and reselling its medium access control protocol layer, and sending a reconfiguration message to the terminal device to effect re-establishment of its radio link control protocol layer and resetting of its medium access control protocol layer.

4. The method of claim 1, wherein
   the master base station effects the alteration in said data handling resources by re-establishing its radio link control protocol layer and not resetting its medium access control protocol layer, sending a reconfiguration message to the terminal device to effect re-establishment of its radio link protocol layer but not resetting of its medium access control layer.

5. The method of claim 4, further comprising:
   arranging that a hybrid automatic repeat request buffer in the medium access control protocol of the said data handling resources in the master base station is empty before re-establishing its radio link control layer.

6. The method of claim 5, wherein
   arranging for the buffer to be empty includes stopping downlink data traffic to the master base station for a predetermined time period following exhaustion of the supply of unique parameter sets.

7. The method of claim 5, wherein
   arranging for the buffer to be empty includes stopping uplink data traffic to the master base station for a predetermined time period following exhaustion of the supply of unique parametersets.

8. The method of claim 5, further comprising:
sending a status report to the secondary base station to indicate an empty status of the buffer, before the secondary base station sends the notification to the master base station.

9. The method of claim 1, wherein
placing the terminal device into a state comprises moving the terminal device to an idle radio communication mode.

10. The method of claim 1, wherein
placing the terminal device into a state comprises releasing the terminal device from connection with the split radio bearers.

11. The method of claim 1, wherein
placing the terminal device into a state comprises moving the terminal device to an inactive connected radio communication mode.

12. The method of claim 1, wherein
placing the terminal device into a state comprises performing an intracell handover of the terminal device.

13. The method of claim 1, wherein
the master base station effects the alteration in said data handling resources by resetting its medium access control layer as part of a procedure in which one of the master base station or the secondary base station changes the type of radio bearer it handles away from the said split radio bearer.

14. A terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station; and the terminal device:
wherein the terminal device comprises a controller unit and a transceiver unit and is configured to:
communicate wirelessly with the base stations including by the use of a split radio bearer receivable at the secondary base station for splitting between the secondary base station and the master base station before delivery to the terminal device; and
effect an alteration in data handling resources of the terminal device which are allocated for handling split ratio radio bearers received from the secondary base station by placing the terminal device into a state in which the data handling resources can no longer handle the split radio bearers in response to a reconfiguration message sent by the master base station to the terminal device in response to receipt by the master base station of a notification sent by the secondary base station following exhaustion of a supply of unique parameter sets used by the secondary base station in security ciphering of received split radio bearers, the notification requiring the master base station to alter data handling resources allocated for handling split radio bearers received from the secondary base station in one or both of the master base station and the terminal device.

15. A method for use in a wireless telecommunications network, the mobile telecommunications network comprising:
a core network;
base stations supported by the core network and each providing wireless connectivity within at least one base station cell where the cells are arranged into a master cell group under control of a master base station and a secondary cell group under control of a secondary base station, wherein in the secondary cell group one cell is designated as a primary secondary cell with responsibility for uplink control signalling in the secondary cell group; and
a terminal device configured to communicate wirelessly with the base stations including by the use of a split radio bearer receivable at the secondary cell group via the primary secondary cell for splitting between the secondary base station and the master base station before delivery to the terminal device; the method comprising:
in the event of a need to change the designation of the primary secondary cell to a different cell in the secondary cell group, the secondary base station sends a notification to the master base station of a requirement to alter data handling resources allocated for handling split radio bearers received from the secondary base station in one or both of the master base station and the terminal device; and
the master base station, in response to the notification, operates to effect an alteration in the said data handling resources by placing the terminal device into a state in which its data handling resources can no longer handle the split radio bearers.

16. The method of claim 15, wherein
the master cell group and the master base station are configured within a Long Term Evolution radio access network, and the secondary base station is a core unit associated with distributed units providing the cells of the secondary cell group, the core unit and the distributed units configured under a different radio access network, the master cell group and the secondary cell group interworking to provide the wireless telecommunications network.

17. The method of claim 15, wherein
placing the terminal device into a state comprises moving the terminal device to an idle radio communication mode.

18. A terminal device for use in a wireless telecommunications network which comprises a core network; base stations supported by the core network and each providing wireless connectivity within at least one base station cell where the cells are arranged into a master cell group under control of a master base station and a secondary cell group under control of a secondary base station wherein in the secondary cell group one cell is designated as a primary secondary cell; and the terminal device:
wherein the terminal device comprises a controller unit and a transceiver unit and is configured to:
communicate wirelessly with the base stations including by the use of a split radio bearer receivable at the secondary cell group for splitting between the secondary base station and the master base station before delivery to the terminal device; and
effect an alteration in data handling resources of the terminal device which are allocated for handling split ratio radio bearers received from the secondary base station by placing the terminal device into a state in which the data handling resources can no longer handle the split radio bearers in response to a reconfiguration message sent by the master base station to the terminal device in response to receipt by the master base station of a notification sent by the secondary base station when a need arises to change the designation of the primary secondary cell to a different cell in the secondary cell group, the notification requiring the master base station to alter data handling resources allocated for handling split radio bearers received from the secondary base station in one or both of the master base station and the terminal device.

\* \* \* \* \*